(12) United States Patent
Lu et al.

(10) Patent No.: US 12,517,164 B2
(45) Date of Patent: Jan. 6, 2026

(54) ARC DETECTION METHOD AND SYSTEM

(71) Applicant: Sungrow Smart Maintenance Technology Co., Ltd., Hefei (CN)

(72) Inventors: Chenpeng Lu, Hefei (CN); Shi Song, Hefei (CN)

(73) Assignee: Sungrow Smart Maintenance Technology Co., Ltd., Hefei (CN)

( * ) Notice: Subject to any disclaimer, the term of this patent is extended or adjusted under 35 U.S.C. 154(b) by 245 days.

(21) Appl. No.: 18/563,352

(22) PCT Filed: Jul. 7, 2022

(86) PCT No.: PCT/CN2022/104316
§ 371 (c)(1),
(2) Date: Nov. 21, 2023

(87) PCT Pub. No.: WO2023/005633
PCT Pub. Date: Feb. 2, 2023

(65) Prior Publication Data
US 2024/0264217 A1 Aug. 8, 2024

(30) Foreign Application Priority Data
Jul. 27, 2021 (CN) .......................... 202110851018.2

(51) Int. Cl.
*G01R 31/14* (2006.01)
*G01R 31/12* (2020.01)
(Continued)

(52) U.S. Cl.
CPC ......... *G01R 31/14* (2013.01); *G01R 31/1272* (2013.01); *G01R 31/42* (2013.01); *H02S 50/10* (2014.12)

(58) Field of Classification Search
CPC .... G01R 31/14; G01R 31/1272; G01R 31/42; G01R 31/12; H02S 50/10; Y02E 10/50;
(Continued)

(56) References Cited

U.S. PATENT DOCUMENTS 9,389,272 B2 * 7/2016 Chaintreuil ............ G01R 31/28
12,099,081 B2 * 9/2024 Xiao ....................... H02S 50/00
12,184,055 B2 * 12/2024 Koga ................. G01R 31/1263

FOREIGN PATENT DOCUMENTS

CN 110456234 A 11/2019
CN 110737732 A 1/2020
(Continued)

OTHER PUBLICATIONS

International Search Report mailed Sep. 19, 2022, in connection with International Application No. PCT/CN2022/104316.

*Primary Examiner* — Giovanni Astacio-Oquendo
(74) *Attorney, Agent, or Firm* — Wolf, Greenfield & Sacks, P.C.

(57) ABSTRACT

An arc detection method and system. The method includes: a station end device detects an arc by means of a first arc detection model, and uploads an arc detection sample to a model training device to update an original arc detection sample in the model training device; the model training device retrains a second arc detection model according to the updated arc detection sample to obtain an updated second arc detection model; and the model training device updates the first arc detection model according to the updated second arc detection model. According to the method, models are respectively trained for different application scenes; in this way, the fault tolerance rate and universality requirement of arc detection can be met, and the sensitivity requirement of arc detection can also be met.

15 Claims, 7 Drawing Sheets

(51) Int. Cl.
*G01R 31/42* (2006.01)
*H02S 50/10* (2014.01)
(58) Field of Classification Search
CPC ...... G06F 18/22; G06F 18/241; G06F 18/214; G06N 20/00
USPC ........................................ 324/551, 537, 500
See application file for complete search history.

(56) References Cited

FOREIGN PATENT DOCUMENTS

| | | | |
|---|---|---|---|
| CN | 111210024 | A | 5/2020 |
| CN | 113129284 | A | 7/2021 |
| CN | 113569947 | A | 10/2021 |
| KR | 102234533 | B1 | 3/2021 |

* cited by examiner

ARC DETECTION METHOD AND SYSTEM

This application is a national stage filing under 35 U.S.C. § 371 of International Patent Application Serial No. PCT/CN2022/104316, filed Jul. 7, 2022, which claims priority to Chinese Patent Application No. 202110851018.2, titled "METHOD AND SYSTEM FOR DETECTING ELECTRIC ARC", filed on Jul. 27, 2021 with the China National Intellectual Property Administration. The contents of these applications are incorporated herein by reference in their entirety.

FIELD

The present disclosure relates to the technical field of photovoltaics, and in particular to a method and a system for detecting an electric arc.

BACKGROUND

An electric arc is a gas discharge that generates high temperature, high brightness, and radiation. Failure to extinguish an electric arc timely may result in damages to cables, loss of power generation and even a fire hazard. A series electric arc is commonly initiated at a direct current side of a photovoltaic system. The photovoltaic system is necessarily capable of detecting an electric arc, in order to cut off a circuit where the electric arc is located in time when the electric arc occurs.

According to the conventional technology, a method for detecting an electric arc includes: acquiring alternating-current component (referred to as a current signal) of a direct current, analyzing the signal in time-domain and frequency-domain, extracting a feature parameter, and comparing the feature parameter with a preset threshold to determine whether an electric arc occurs. Multiple parameters in both time-domain and frequency-domain may be effectively integrated by using machine learning, and it is comprehensively determined whether an electric arc occurs from multiple dimensions, to improve the accuracy of detection. Therefore, the machine learning becomes an emerging method for detecting an electric arc.

However, the photovoltaic system is taken as an example, an inverter model and an interference signal from the power grid vary from application scenario to application scenario due to the impact of inherent characteristics of the photovoltaic system. As a result, it is difficult for an initial training set, when being established, to include all operating conditions. In addition, a model is trained by using sample data including various operating conditions, a fault tolerance and universality of the model are improved. However, the sensitivity of the model is reduced, that is, the model fails to adapt to a specific operating condition.

A method and a system for detecting an electric arc are provided according to embodiments of the present disclosure, to adapt a model to an application scenario, which can meet the requirements of the fault tolerance and the universality of the electric arc detection, and further meet the requirements of the sensitivity of the electric arc detection.

In a first aspect, the method for detecting an electric arc is provided according to an embodiment of the present disclosure, and is performed by an electric arc detection system. The system includes a station device and a model training device. The station device is provided with a first electric arc detection model. The method includes: detecting the electric arc through the first electric arc detection model, uploading an electric arc detection sample to the model training device by the station device, and updating an electric arc detection sample originally in the model training device; retraining a second electric arc detection model based on the updated electric arc detection sample by the model training device, to obtain the updated second electric arc detection model; and updating the first electric arc detection model based on the updated second electric arc detection model, by the model training device.

In an embodiment, the detecting the electric arc through the first electric arc detection model by the station device includes: sampling a current signal and extracting a feature parameter; and determining by the first electric arc detection model based on the feature parameter whether the electric arc occurs.

In an embodiment, the electric arc detection sample includes a feature parameter, an electric arc flag, a device serial number, a sample sampling time, and a sample serial number. the feature parameter is a basis for the first electric arc detection model to detect the electric arc. The electric arc flag indicates whether the electric arc occurs.

In an embodiment, the method further includes: manually verifying the electric arc detection sample before the uploading the electric arc detection sample to the model training device. The manually verifying the electric arc detection sample includes: manually determining whether a determination result by the first electric arc detection model is correct, and changing a value of the electric arc flag when the determination result is incorrect.

In an embodiment, the station device is further provided with a local database. The method further includes: storing the electric arc detection sample to the local database, and uploading the stored electric arc detection sample to the model training device periodically or quantitatively by the local database, before the uploading the electric arc detection sample to the model training device.

In an embodiment, the updating the electric arc detection sample originally in the model training device includes: replacing earliest electric arc detection samples with latest electric arc detection samples. The earliest electric arc detection samples are equal to the latest electric arc detection samples in number, and the earliest electric arc detection samples indicating that the electric arc occurs are retained.

In an embodiment, the station device is at least one in number, the model training device is provided with at least one training module corresponding to the at least one station device, and station devices corresponding to the same training module operate under a same operating condition.

In an embodiment, the station devices corresponding to the same training module are of a same model.

In an embodiment, the method further includes: connecting an additional station device to a station. The connecting the additional station device to the station includes: determining whether the additional station device matches a training module in the model training device; updating a first electric arc detection model of the additional station device as a corresponding electric arc detection model by the model training device, when the additional station device matches a training module; and pushing an initial electric arc detection model for the additional station device when the additional station device does not match any training module.

In an embodiment, the method further includes: training an initial electric arc detection model for the station device before the detecting the electric arc through the first electric arc detection model. The training the initial electric arc detection model includes: connecting the station device to the model training device; acquiring initial electric arc detection samples to form an initial training set by the model training device; training the second electric arc detection model by the model training device using the initial training set to obtain an initial electric arc detection model; and sending the initial electric arc detection model by the model training device to the station device to form the first electric arc detection model.

In an embodiment, the second electric arc detection model is trained by a machine learning algorithm.

In a second aspect, a system for detecting an electric arc is provided according to an embodiment of the present disclosure. The system performs the method in the first aspect of the present disclosure. The system includes: a station device and a model training device. The station device is provided with a first electric arc detection model. The station device is configured to detect the electric arc through the first electric arc detection model, and generate an electric arc detection sample. The model training device is connected to the station device. The model training device is configured to: receive the electric arc detection sample uploaded by the station device and update a stored electric arc detection sample; retrain a second electric arc detection model based on the updated electric arc detection sample to obtain an updated second electric arc detection model; and update the first electric arc detection model based on the updated second electric arc detection model.

In an embodiment, the station device is at least one in number. The model training device is provided with at least one training module corresponding to the at least one station device. Station devices corresponding to the same training module are configured to operate under a same operating condition. The training module includes: a database and a model training unit. The database is configured to store the electric arc detection sample corresponding to the station device. The model training unit is configured to retrain the second electric arc detection model based on the electric arc detection sample to obtain the updated second electric arc detection model.

In an embodiment, the system further includes a host computer connected between the station device and the model training device. The host computer is configured to manually verify the electric arc detection sample uploaded by the station device.

It can be seen that according to the embodiments of the present disclosure, the electric arc detection sample is uploaded to the model training device, for the model training device to retrain the second electric arc detection model based on the updated electric arc detection sample, to obtain the updated second electric arc detection model. The original electric arc detection sample is applicable to most station devices, and therefore has high fault tolerance and universality. The electric arc detection sample received by the model training device from the station device is generated during the actual operation of the station device, and thus is more applicable to the actual operating condition. Therefore, according to the embodiments of the present disclosure, an electric arc detection model is trained for the station device by incremental learning, so that the trained electric arc detection model has uniqueness and timeliness, thereby improving the accuracy of electric arc detection. In summary, according to the embodiments of the present disclosure, the model is adapted to the application scenario, which can meet the requirements of the fault tolerance and the universality of the electric arc detection, and further meet the requirements of the sensitivity of the electric arc detection.

DETAILED DESCRIPTION

Hereinafter, the present disclosure is further explained in detail in conjunction with the drawings and embodiments. It should be understood that the embodiments described herein are only for explaining the present disclosure, rather than limiting the present disclosure. In addition, it should be noted that, only some of structures related to the present disclosure rather than all of the structures are show in the drawings for ease of description.

Figure 1:
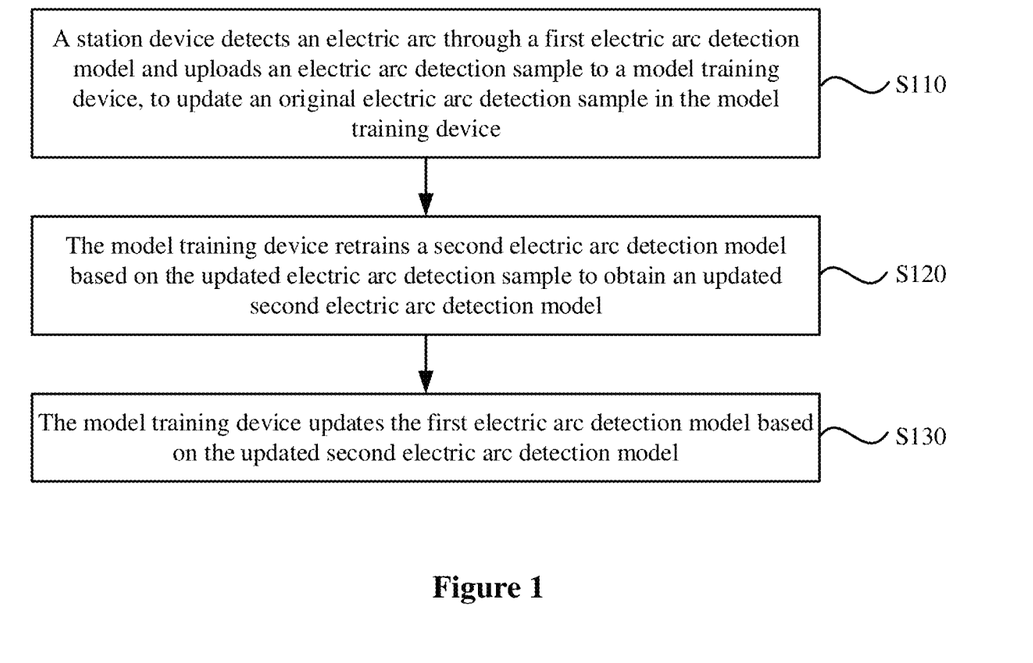
FIG. 1 is a schematic flow chart illustrating a method for detecting an electric arc according to an embodiment of the present disclosure.

A method for detecting an electric arc is provided according to an embodiment of the present disclosure. The method for detecting an electric arc is applicable to electric arc detection of a photovoltaic system. The method for detecting an electric arc is performed by an electric arc detection system. The system includes a station device and a model training device. The station device is provided with a first electric arc detection model, and the first electric arc detection model may be implemented by a software program. FIG. 1 is a schematic flow chart illustrating the method for detecting an electric arc according to an embodiment of the present disclosure. As shown in FIG. 1, the method for detecting an electric arc includes the following steps S110 to S130.

In step S110, the station device detects an electric arc through the first electric arc detection model and uploads the electric arc detection sample to the model training device, to update an original electric arc detection sample in the model training device.

The station device may be a device for detecting an electric arc, for example, an inverter or a combiner box, in a photovoltaic power station. An environmental condition or weather condition may vary from photovoltaic power station to photovoltaic power station. In a same photovoltaic power station, the inverters or combiner boxes may vary in model. Therefore, since station devices vary in operating condition, the inverters or the combiner boxes also vary in alternating-current component (referred to as a current signal) at a direct-current side. The operating condition of the station device is acquired by acquiring the current signal.

The first electric arc detection model is arranged in the photovoltaic power station, which is a machine learning training model for detecting an electric arc at the direct-current side. The first electric arc detection model may be implemented by the software program. The first electric arc detection model may also be referred to as a station electric arc detection model. The model is originally an initial training model and is applicable to most station devices, and has high fault tolerance and universality. The station device detects an electric arc through the first electric arc detection model as follows. The station device samples a current signal regularly, extracts a feature parameter from the sampled current signal, inputs the extracted feature parameter into the first electric arc detection model. The first electric arc detection model determines based on the feature parameter whether there is an electric arc.

The electric arc detection sample is parameter data generated during each electric arc detection. For example, the electric arc detection sample includes the feature parameter, an electric arc flag, a device serial number, a sample sampling time, and a sample serial number. The feature parameter is a basis for the first electric arc detection model to detect an electric arc. The electric arc flag indicates whether there is an electric arc. For example, in a case that the outputted electric arc flag is 1, it is determined that there is an electric arc. In a case the outputted electric arc flag is 0, it is determined that there is no electric arc.

In step S120, the model training device retrains a second electric arc detection model based on the updated electric arc detection sample to obtain the updated second electric arc detection model.

The model training device, for example, a cloud server, is capable of storing a large amount of data and training the electric arc detection model. The second electric arc detection model may also be referred to as a cloud electric arc detection model. The model training device may be arranged in the power station to train and update an electric arc detection model for various station devices in the power station. The model training device may further be arranged outside the power station to train and update an electric arc detection model for station devices of multiple power stations.

The model training device receives the electric arc detection sample and updates the stored electric arc detection sample to obtain the updated electric arc detection sample, thereby forming a new training set. For example, the model training device updates the electric arc detection sample by replacing the earliest electric arc detection samples with latest electric arc detection samples, where the earliest electric arc detection samples are equal to the latest electric arc detection samples in number. In a case that a sample among the earliest electric arc detection samples is determined to indicate that an electric arc occurs, the sample is retained. Specifically, the sample is determined to indicate that an electric arc occurs, the electric arc flag of the sample is 1, and the sample with the electric arc flag being 1 is retained. In this way, the number of electric arc detection samples with the electric arc flag being 1 stored in the model training device is increasing. Furthermore, the second electric arc detection model is trained by using the updated training set to obtain updated cloud-end electric arc detection samples, thereby helping to improve the sensitivity of the second electric arc detection model. The second electric arc detection model is trained by using a machine learning algorithm, which is in various types such as a classification tree, a support vector machine, or a random forest. The machine learning algorithms are not limited in the present disclosure.

In step S130, the model training device updates the first electric arc detection model based on the updated second electric arc detection model.

The model training device converts the updated electric arc detection model into a file format that is executable by the station device, thereby replacing the original first electric arc detection model.

It can be seen that according to the embodiments of the present disclosure, the electric arc detection sample is uploaded to the model training device, for the model training device to retrain the second electric arc detection model based on the updated electric arc detection sample, to obtain the updated second electric arc detection model. The original electric arc detection sample is applicable to most station devices, and therefore has high fault tolerance and universality. The electric arc detection sample received by the model training device from the station device is generated during the actual operation of the station device, and thus is more applicable to the actual operating condition. Therefore, according to the embodiments of the present disclosure, an electric arc detection model is trained for the station device by incremental learning, so that the trained electric arc detection model has uniqueness and timeliness, thereby improving the accuracy of electric arc detection. In summary, according to the embodiments of the present disclosure, the model is adapted to the application scenario, which can meet the requirements of the fault tolerance and the universality of the electric arc detection, and further meet the requirements of the sensitivity of the electric arc detection.

Based on the above embodiments, in an embodiment, the method further includes manually verifying the electric arc detection sample before the electric arc detection sample is uploaded to the model training device. Specifically, the manually verifying the electric arc detection sample includes: manually determining whether a determination result by the first electric arc detection model is correct on site, and changing the value of the electric arc flag in a case that the determination result by the first electric arc detection model is incorrect.

For example, when the first electric arc detection model determines that an electric arc occurs, workers go to the site for troubleshooting. If the workers found that no electric arc actually occurs, an electric arc flag in a corresponding electric arc detection sample is changed to 0. In a case that the first electric arc detection model determines that no electric arc occurs and other monitoring parameters are abnormal, the workers go to the site for troubleshooting. If the workers found that the electric arc actually occurs, an electric arc flag of each of electric arc detection samples obtained in a duration of the electric arc is changed to 1. According to the embodiments of the present disclosure, the accuracy of the electric arc detection samples is further improved, thereby improving the accuracy of training the second electric arc detection model by using the electric arc detection samples.

Based on the above embodiments, in an embodiment, the station device is further provided with a local database. The method further includes: storing the electric arc detection sample to the local database before the electric arc detection sample is uploaded to the model training device. The local database uploads the stored electric arc detection samples to the model training device periodically or quantitatively.

The electric arc detection samples stored in the local database form a sample set, and the sample set is uploaded to the model training device, which can save network resources and improve data transmission efficiency. In practice, an interval for periodically uploading the electric arc detection samples the and the quantity for quantitatively uploading the electric arc detection samples may be set as needed. For example, the periodically uploading may be implemented by uploading data in the local database to the model training device at ten-day intervals, and the quantitatively uploading may be implemented by uploading samples in the local database to the model training device whenever the number of the samples reaches 10000.

Based on the above embodiments, in an embodiment, the data in the local database is deleted from the local database after being uploaded to the model training device, to free up a storage space of the local database.

Based on the above embodiments, in an embodiment, the number of the station device is at least one. The model training device is provided with at least one training module. The at least one training module corresponds to the at least one station device. The station devices corresponding to the same training module operate under the same operating condition. The photovoltaic power station normally includes a large number of station devices, some of the station devices operate under the same operating condition, while other station devices station devices operate in respective operating conditions. For example, station devices with a same model operate under the same operating condition, and thus the station devices corresponding to the same training module are set as the same model.

Figure 2:
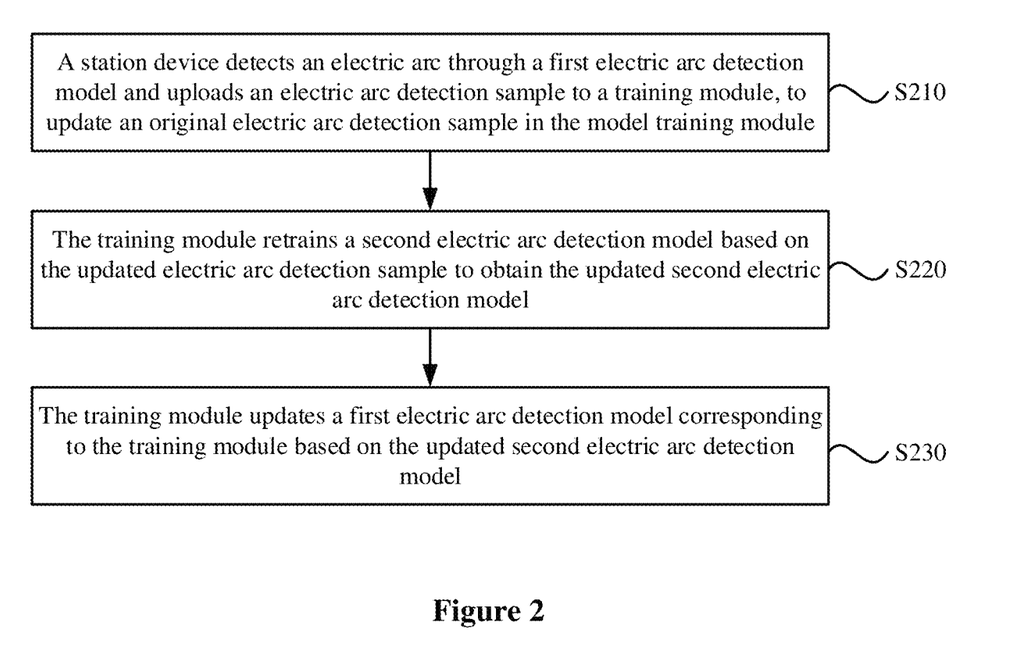
FIG. 2 is a schematic flow chart illustrating a method for detecting an electric arc according to another embodiment of the present disclosure.

FIG. 2 is a schematic flow chart illustrating a method for detecting an electric arc according to another embodiment of the present disclosure. As shown in FIG. 2, the method for detecting an electric arc includes the following steps S210 to S230.

In step S210, the station device detects an electric arc through the first electric arc detection model and uploads the electric arc detection sample to the training module corresponding to the station device, to update the original electric arc detection sample in the training module.

The training module includes a database. For example, the photovoltaic power station includes six station devices. Three of the six station devices are in a model 1 and the other three are in a model 2. The station devices with the model 1 correspond to a first training module, and the station devices with the model 2 correspond to a second training module. The station devices with the model 1 generate electric arc detection samples and upload the electric arc detection samples to the first training module. The station devices with the model 2 generate electric arc detection samples and upload the electric arc detection samples to the second training module.

In step S220, the training module retrains the second electric arc detection model based on the updated electric arc detection samples to obtain the updated second electric arc detection model.

For example, the first training module retrains the electric arc detection model based on the updated electric arc detection samples to obtain the updated electric arc detection model. The electric arc detection model is more suitable for the station devices with the model 1 to detect an electric arc. Similarly, the second training module retrains the second electric arc detection model based on the updated electric arc detection samples to obtain the updated electric arc detection model. The electric arc detection model is more suitable for the station devices with the model 2 to detect an electric arc.

In step S230, the training module updates the first electric arc detection model corresponding to the training module based on the updated second electric arc detection model.

For example, the first training module updates the first electric arc detection model corresponding to the station devices with the model 1, and the second training module updates the first electric arc detection model corresponding to the station devices with the model 2.

It can be seen that according to the embodiments of the present disclosure, one training module corresponds to at least one station device, and the station devices corresponding to the same training module operate under the same operating condition. Therefore, the electric arc detection samples in the training module corresponding to the station devices are more applicable to the actual operating condition of the station device, and the trained electric arc detection model has uniqueness and timeliness, thereby improving the accuracy of detection. Moreover, according to the embodiments of the present disclosure, the station devices operating under the same operating condition correspond to the same training module, thereby helping in saving resources for the model training device.

Figure 3:
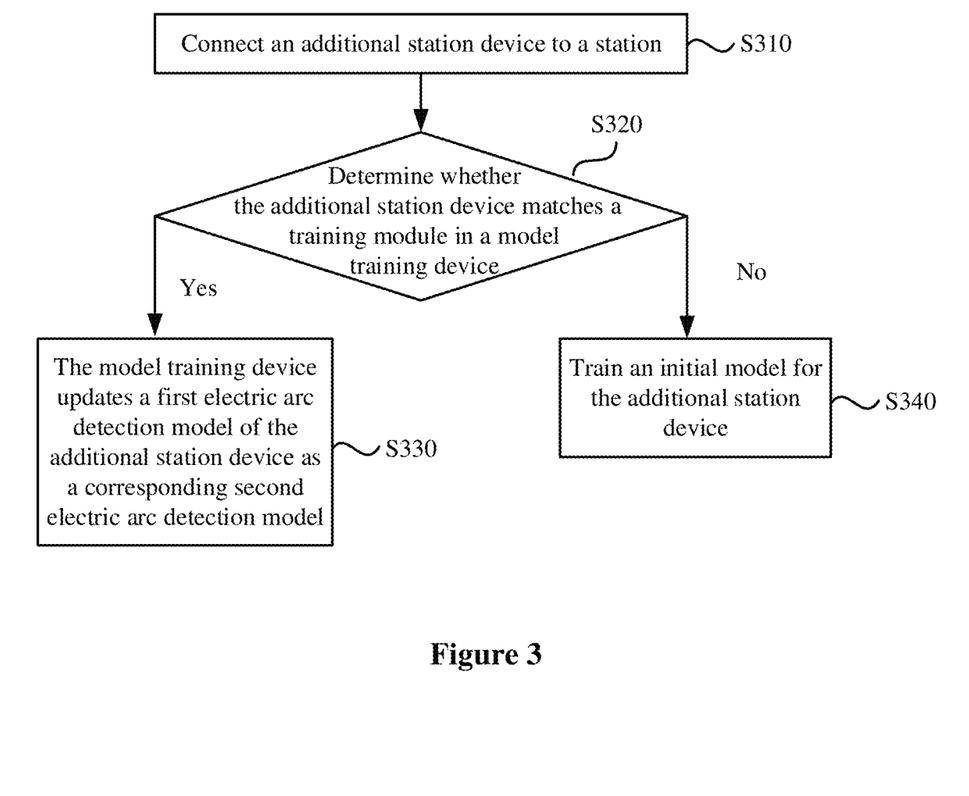
FIG. 3 is a schematic flow chart illustrating connection of additional station device to a system for detecting an electric arc according to an embodiment of the present disclosure.

FIG. 3 is a schematic flow chart illustrating connection of an additional station device to a system for detecting an electric arc according to an embodiment of the present disclosure. Based on the above embodiments, in an embodiment, the method for detecting an electric arc further includes: connecting an additional station device to the station. As shown in FIG. 3, the connecting the additional station device to the station includes the following steps S310 to S340.

In step S310, the additional station device is connected to the station.

The additional station device may be connected to the system for detecting an electric arc during an early construction stage of the system for detecting an electric arc. Alternatively, the additional station device may be connected to the system for detecting an electric arc when a long time period expires from a time instant when the system for detecting an electric arc is constructed.

In step S320, it is determined whether the additional station device matches a training module in the model training device.

For example, each training module corresponds to station devices with the same model. In a case that the additional station device with a model corresponds to a training module, it is determined that the additional station device matches the training module. Otherwise, it is determined that the additional station device does not match any training module.

In a case that the additional station device matches the training module, step S330 is performed. In a case that the additional station device does not match the training module, step S340 is performed.

In step S330, the model training device updates a first electric arc detection model of the additional station device as a corresponding second electric arc detection model.

For example, since the training module in the model training device has already undergone incremental learning to adapt to the station device with the model, and therefore the electric arc detection model in the training module has an advantage of high accuracy. The first electric arc detection model in the additional station device is directly updated as the corresponding second electric arc detection model without repeated training, which is conducive to saving learning time for the additional station device.

In step S340, an initial electric arc detection model is pushed for the additional station device.

The additional station device is connected to the station through the steps S310 to S340. From the above steps, it can be seen that according to the embodiment of the present disclosure, when the additional station device is connected to the system, the electric arc detection model originally existed in the system is directly used without training the initial electric arc detection model for the additional station device, thereby saving resources for the system.

Figure 4:
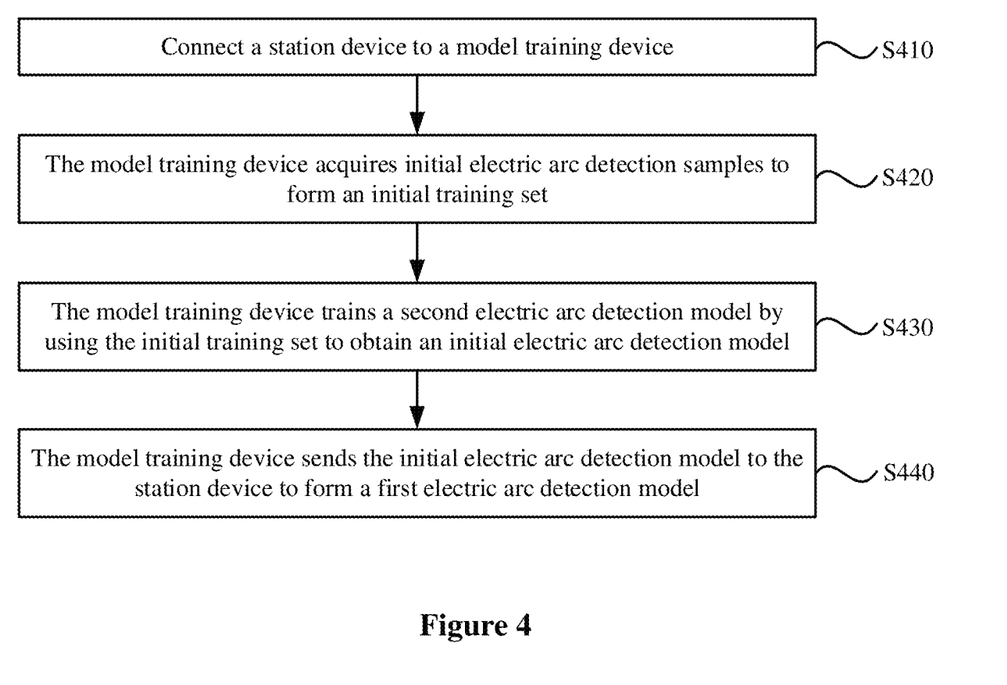
FIG. 4 is a schematic flow chart illustrating training an initial electric arc detection model for a station device according to an embodiment of the present disclosure.

FIG. 4 is a schematic flow chart illustrating training of the initial electric arc detection model for the station device according to an embodiment of the present disclosure. The steps are applicable to not only initial construction of the system for detecting an electric arc but also to a case when an additional station device is connected to the system for detecting an electric arc. Based on the above embodiments, as shown in FIG. 4, in an embodiment, the training the initial electric arc detection model for the station device includes the following steps S410 to S440.

In step S410, the station device is connected to the model training device.

The station device is connected to the model training device by connecting the station device to a wireless router or a wired network having access to the model training device. The model training device may be constructed by taking the photovoltaic power station as a unit. The model training device may be constructed on an external network or an internal local area network of the photovoltaic power station. In an embodiment, the model training device assigns a unique device serial number to each of the station devices to distinguish the station devices.

In step S420, the model training device acquires initial electric arc detection samples to form an initial training set.

The number of the initial electric arc detection samples is more than one, and the initial electric arc detection samples correspond to current signals under various operating conditions. The multiple initial current detection samples form the initial training set. The initial electric arc detection samples are different from the electric arc detection samples uploaded by the station device in the foregoing embodiments. The initial electric arc detection samples include samples under various operating conditions, so that the trained initial electric arc detection model is universal. For example, the initial electric arc detection samples include samples under various conditions, such as current signals with different amplitudes, multiple inverter models, multiple combiner box models, and multiple weather conditions. The initial electric arc detection samples include samples during normal operation and samples in case of electric arcs. The model training device may directly acquire the initial electric arc detection samples. For example, the initial electric arc detection samples (i.e., the initial training set) are copied onto the model training device. Alternatively, current signals under various operating conditions are obtained first, and then the current signals are processed to obtain the initial electric arc detection samples.

For example, the initial electric arc detection samples are obtained as follows. Under various operating conditions, currents signal during the normal operation and current signals in case of electric arcs are obtained. Feature parameters of the current signals are extracted and each of the feature parameters is set based on whether an electric arc occurs. For example, a feature parameter set to 1 indicates that an electric arc occurs, and a feature parameter set to ( ) indicates that no electric arc occurs. Then, the initial electric arc detection sample is formed. The electric arc detection sample includes the feature parameter, the sample sampling time, the sample serial number and the electric arc flag. All the initial electric arc detection samples form the initial training set.

In step S430, the model training device trains the second electric arc detection model based on the initial training set to obtain the initial electric arc detection model.

The second electric arc detection model is trained by using the machine learning algorithm, which is in various types such as a classification tree, a support vector machine, or a random forest. The initial electric arc detection model is trained by using the initial training set formed by the initial electric arc detection samples, and thus has high fault tolerance and universality.

In step S440, the model training device sends the initial electric arc detection model to the station device to form the first electric arc detection model.

The model training device may convert the initial electric arc detection model into a file format that is executable by the station device, thus forming the first electric arc detection model. That is, station devices in various models obtain the same initial electric arc detection model. Similar to the initial electric arc detection model, this first electric arc detection model has the high fault tolerance and universality, and may detect an electric arc for various types of station devices.

Figure 5:
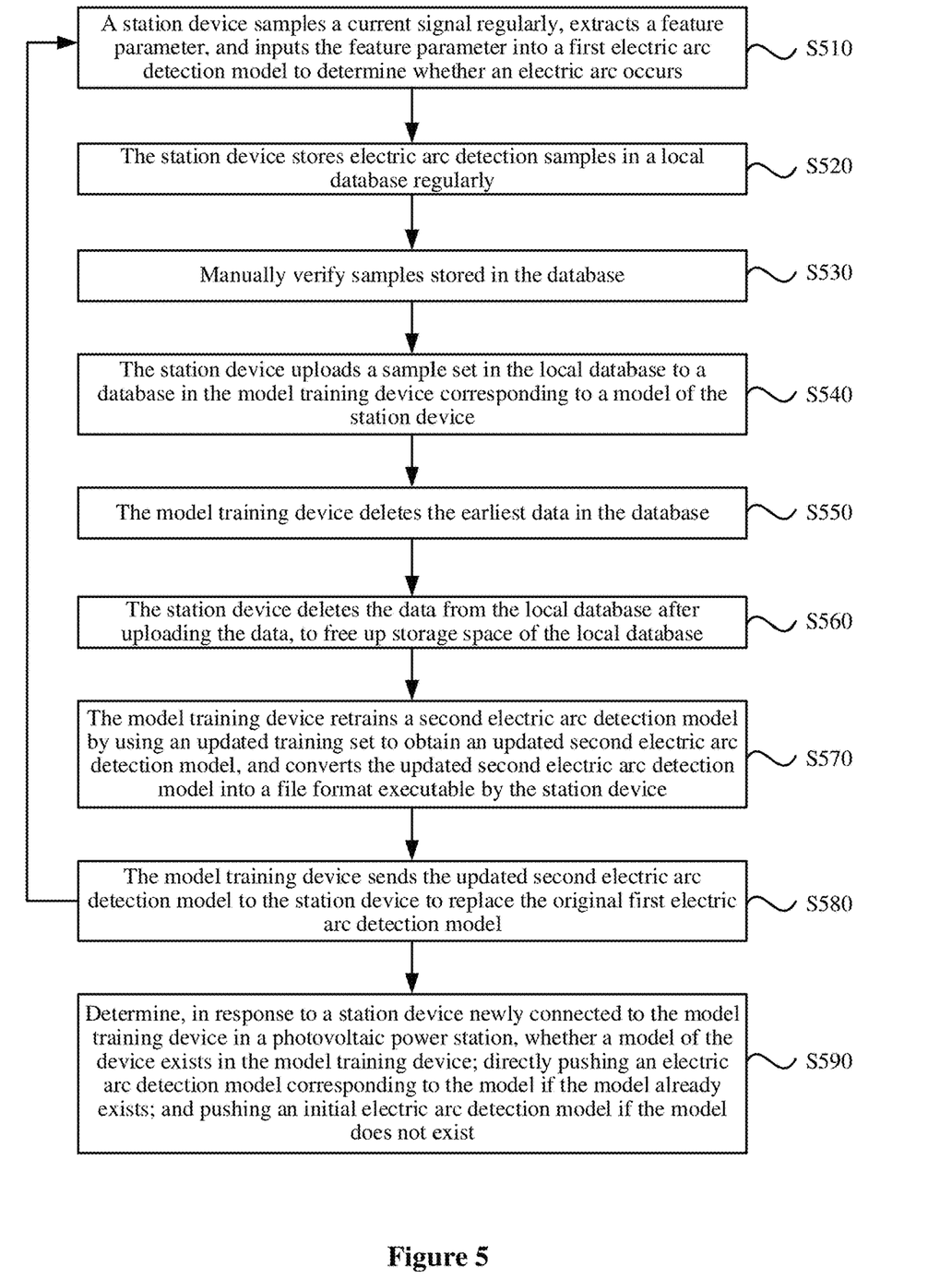
FIG. 5 is a schematic flow chart illustrating a method for detecting an electric arc according to another embodiment of the present disclosure.

FIG. 5 is a schematic flow chart illustrating a method for detecting an electric arc according to another embodiment of the present disclosure. As shown in FIG. 5, based on the above embodiments, the method for detecting an electric arc includes the following steps S510 to S590.

In step S510, the station device samples a current signal regularly, extracts a feature parameter, and inputs the feature parameter into a first electric arc detection model to determine whether an electric arc occurs.

If it is determined that an electric arc occurs, the electric arc flag outputted by the electric arc detection model is 1. If it is determined that no electric arc occurs, the electric arc flag outputted by the electric arc detection model is 0.

In step S520, the station device stores electric arc detection samples in the local database of the station device regularly.

The interval for storage is greater than the interval for sampling. Multiple electric arc detection samples are stored in the local database to form a sample set. The electric arc detection sample includes the feature parameter, the electric arc flag, the device serial number, the sample sampling time, and the sample serial number.

In step S530, the samples stored in the database are manually verified.

For example, when the first electric arc detection model determines that an electric arc occurs, the workers go to the site for troubleshooting. If the workers found that no electric arc actually occurs, an electric arc flag in a corresponding sample is changed to 0.

When the first electric arc detection model determines that no electric arc occurs and other monitoring parameters are abnormal, the workers go to the site for troubleshooting. If the workers found that the electric arc actually occurs, an electric arc flag in a sample obtained in a duration of the electric arc is changed to 1. It can be understood that in a case that the duration of the electric arc is less than or equal to the interval for sampling, the number of the sample obtained in the duration of the electric arc is 1. In a case that the duration of the electric arc is long, the number of samples obtained in the duration of the electric arc may be two or more.

In step S540, the station device uploads the sample set in the local database to a database in the model training device corresponding to the model of the station device.

The station device may upload the sample set periodically, quantitatively, or periodically and quantitatively. The periodically uploading specifies a time interval of uploading. For example, the sample set in the local database is uploaded to the cloud at ten-day intervals. The quantitatively uploading specifies the number of the uploaded samples, that is, the samples are uploaded whenever the number of the samples in the local database reaches a constant. For example, whenever the number of pieces of data in the local database reaches 10000, the 10000 pieces of data are uploaded to the cloud. The periodically and quantitatively uploading is performed whenever the number of the samples reaches a constant or at intervals as defined for the periodically uploading.

In step S550, the model training device deletes the earliest data from the corresponding database.

The deleted samples are equal to the most recently uploaded samples in number, and samples in the initial training set are gradually replaced with the latest electric arc detection samples. In addition, an electric arc detection sample with the electric arc flag being 1 is not deleted.

In step S560, the station device deletes the data from the local database after uploading the data, to free up the storage space of the local database.

In step S570, the model training device retrains the second electric arc detection model by using an updated training set to obtain the updated second electric arc detection model, and converts the updated second electric arc detection model into a file format that is executable by the station device.

In step S580, the model training device sends the updated second electric arc detection model to the station device to replace the original first electric arc detection model.

The first electric arc detection model corresponding to a model is trained by using samples uploaded by station devices with the model. Therefore, the electric arc detection model corresponding to the model has uniqueness.

The steps S510 to S580 are performed repeatedly, to update the electric arc detection model corresponding to the station device.

In step S590, it is determined, in response to a station device newly connected to the model training device in a photovoltaic power station, whether a model of the device exists in the model training device. An electric arc detection model corresponding to the model is directly pushed if the model already exists. An initial electric arc detection model is pushed if the model does not exist.

In summary, according to the embodiments of the present disclosure, cloud databases are established for respective models of station devices, and electric arc detection samples of station devices are periodically uploaded to update a training set, so that the updated training set is more applicable to the actual operating condition. The model training device periodically uploads the second electric arc detection model by using the updated training set, and pushes the updated second electric arc detection model to the station device. The station device detects an electric arc by using the updated first electric arc detection model. Therefore, according to the embodiments of the present disclosure, models are periodically trained for different models of devices by using incremental learning, so that the trained electric arc detection model has uniqueness and timeliness, thereby improving the accuracy of electric arc detection. In addition, in the embodiments of the present disclosure, it is determined, in response to a station device newly connected to the model training device, whether a model of the device exists in the model training device. An electric arc detection model corresponding to the model is directly pushed if the model already exists, without repeated training.

Figure 6:
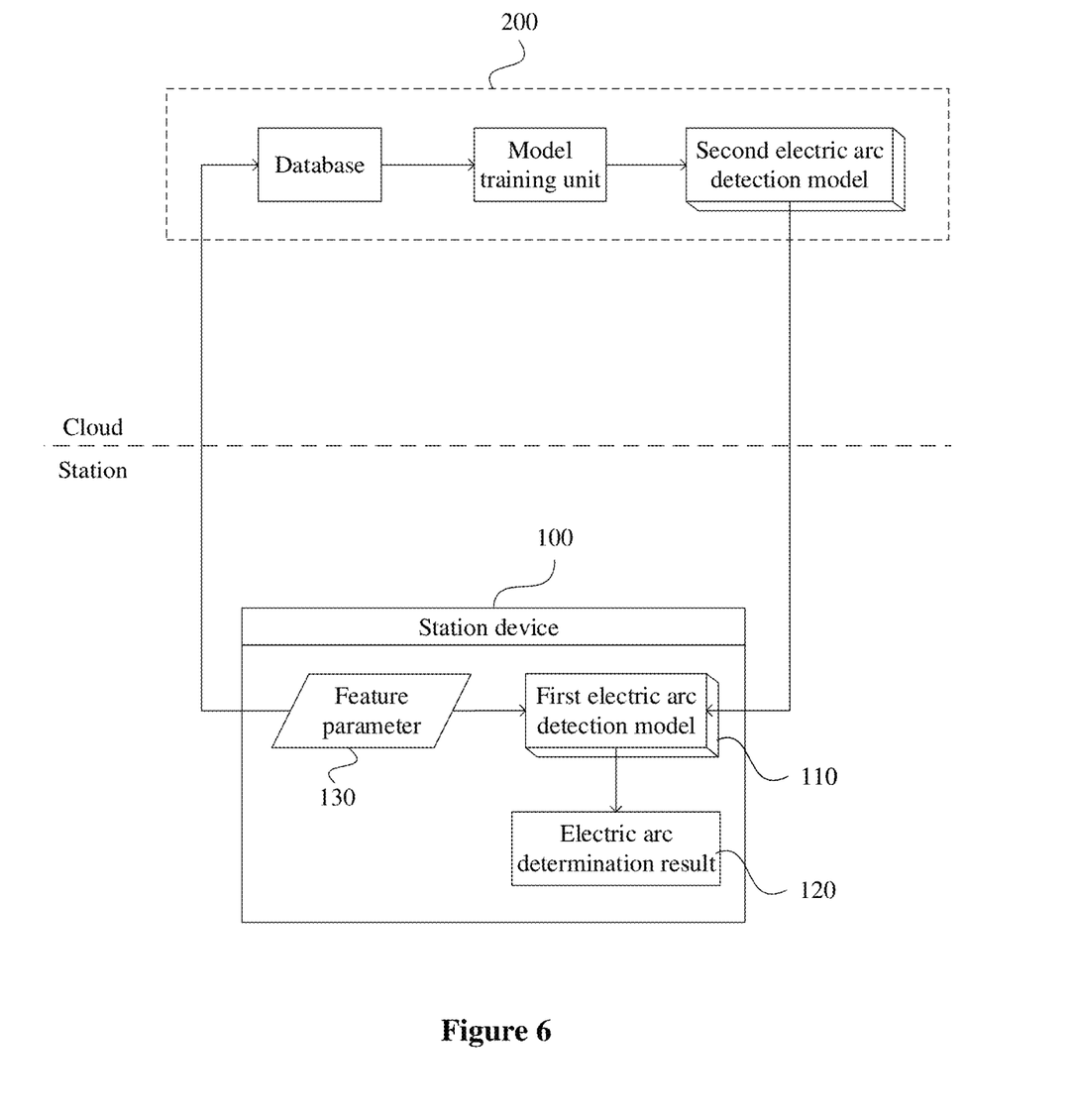
FIG. 6 is a schematic structural diagram illustrating a system for detecting an electric arc according to an embodiment of the present disclosure.

A system for detecting an electric arc is further provided according to an embodiment of the present disclosure, and may perform the method for detecting an electric arc according to any one of the embodiments of the present disclosure. The system for detecting an electric arc has the similar technical principles and technical effects to the method for detecting an electric arc. FIG. 6 is a schematic structural diagram of the system for detecting the electric arc according to an embodiment of the present disclosure. As shown in FIG. 6, the system includes a station device 100 and a model training device 200. The station device 100 is provided with a first electric arc detection model 110. The first electric arc detection model 110 may be implemented by a software program. The station device 100 is configured to detect an electric arc through the first electric arc detection model 110, and generate an electric arc detection sample. Specifically, the station device 100 is configured to sample a current signal, extract a feature parameter 130 form the sampled current signal, and input the extracted feature parameter 130 into the first electric arc detection model 110. The first electric arc detection model 110 is configured to determine whether an electric arc occurs based on the feature parameter, to obtain an electric arc determination result 120. In a case that the electric arc determination result indicates that an electric arc occurs, the electric arc flag outputted by the electric arc detection model is 1. In a case that the electric arc determination result indicates that no electric arc occurs, the electric arc flag outputted by the electric arc detection model is 0.

The model training device 200 is connected to the station device 100. The model training device 200 is configured to receive the electric arc detection sample uploaded by the station device 100 and update a stored electric arc detection sample. For example, the electric arc detection sample includes the feature parameter, the electric arc flag, the device serial number, the sample sampling time, and the sample serial number. The model training device 200 is further configured to retrain a second electric arc detection model by using the updated electric arc detection sample to obtain an updated second electric arc detection model; and update the first electric arc detection model 110 based on the updated second electric arc detection model.

The station device 100 may be a device for detecting an electric arc, for example, an inverter or a combiner box, in a photovoltaic power station. The first electric arc detection model may also be referred to as a station electric arc detection model, that is, the station device 100 is arranged in the station. The model training device 200, for example, a cloud server, is capable of storing a large amount of data and training the electric arc detection model. The second electric arc detection model may also be referred to as a cloud electric arc detection model, that is, the model training device 200 is arranged in the cloud.

Figure 7:
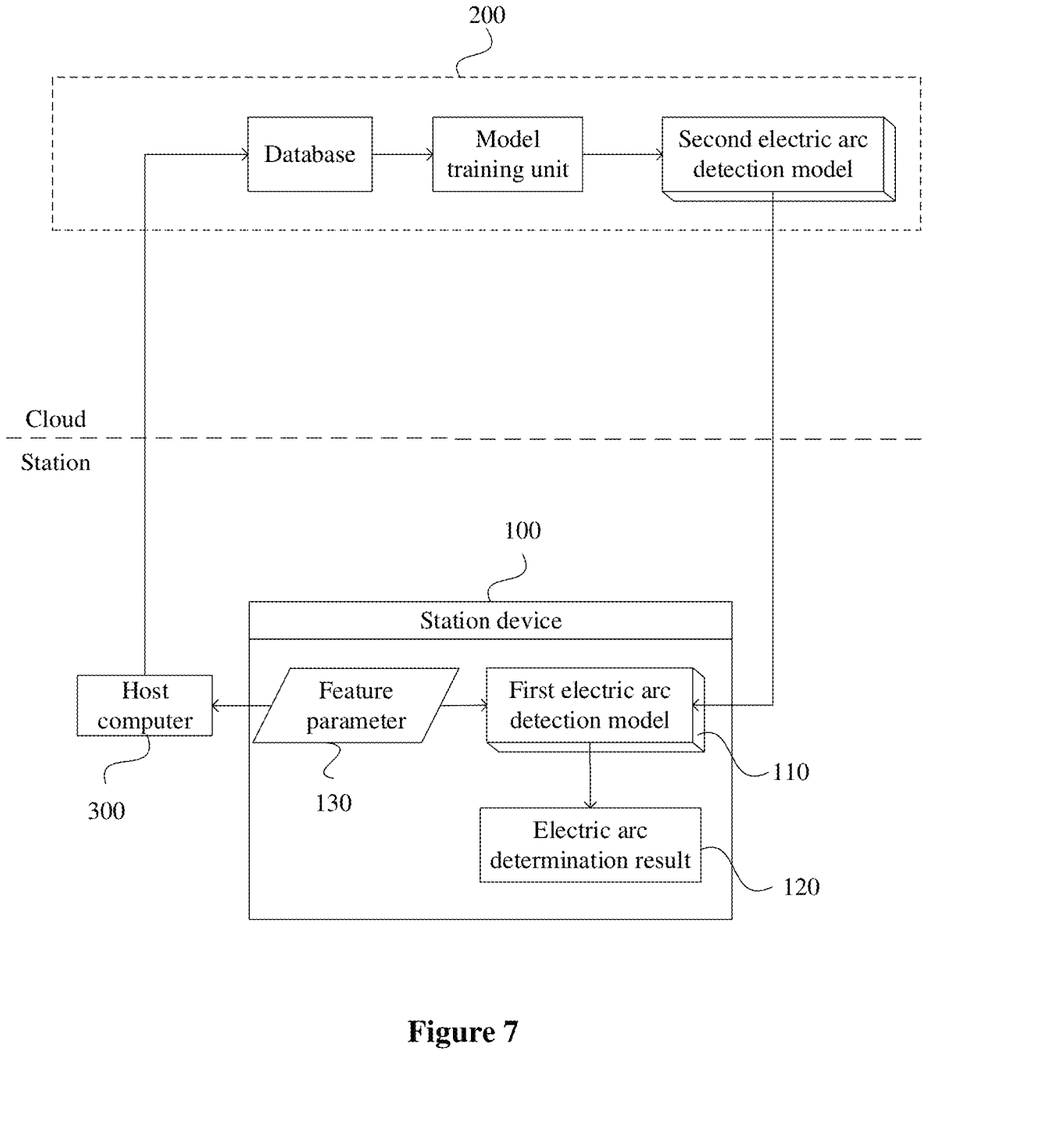
FIG. 7 is a schematic structural diagram illustrating a system for detecting an electric arc according to another embodiment of the present disclosure.

FIG. 7 is a schematic structural diagram of the system for detecting an electric arc according to another embodiment of the present disclosure. As shown in FIG. 7, based on the above embodiments, the system further includes a host computer 300. The host computer 300 is connected between the station device 100 and the model training device 200. The host computer 300 is configured to manually verify the electric arc detection sample uploaded by the station device 100. The host computer 300 is arranged in the station.

Based on the above embodiments, the station device 100 is further provided with a local database. The local database is configured to store the electric arc detection samples, and upload the stored electric arc detection samples to the model training device 200 periodically or quantitatively.

Figure 8:
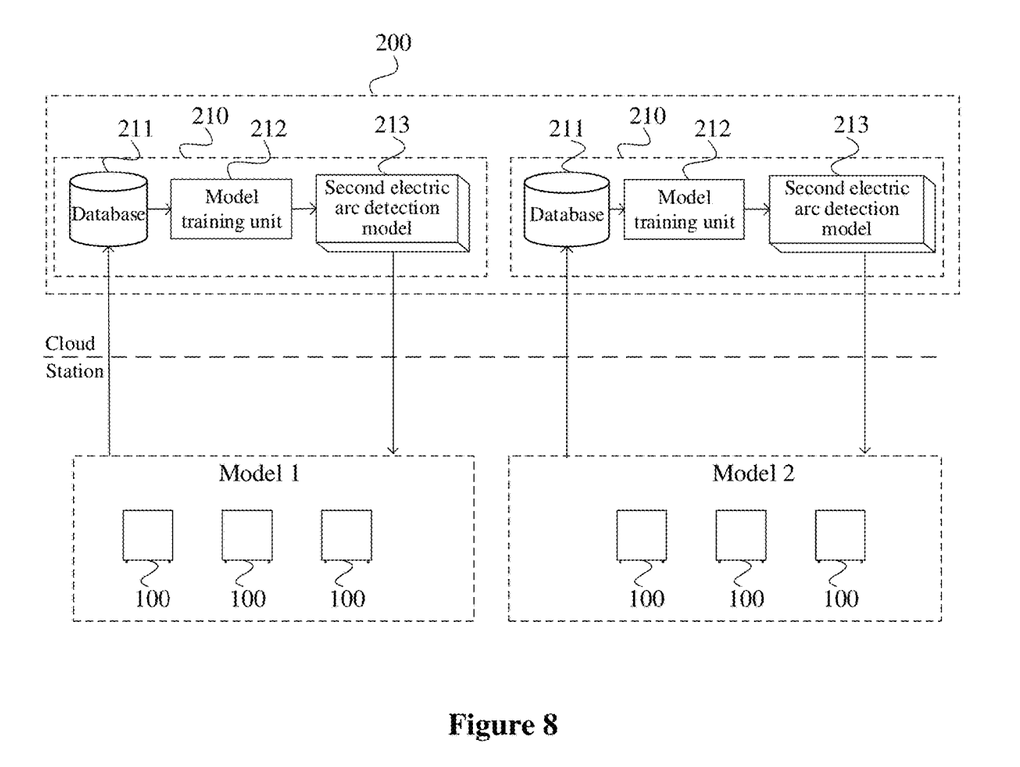
FIG. 8 is a schematic structural diagram illustrating a system for detecting an electric arc according to another embodiment of the present disclosure.

FIG. 8 is a schematic structural diagram of the system for detecting an electric arc according to another embodiment of the present disclosure. As shown in FIG. 8, based on the above embodiments, in some embodiments, the number of the station device 100 is at least one. The model training device 200 is provided with at least one training module 210, and the station devices 100 corresponding to the same training module 210 operate under the same operating condition.

The training module 210 includes a database 211 and a model training unit 212. The database 211 is configured to store electric arc detection samples corresponding to the station device 100. The model training unit 212 is configured to retrain the second electric arc detection model based on the electric arc detection samples to obtain a second electric arc detection model 213.

The station devices 100 corresponding to the same training module 210 are of the same model. For example, the photovoltaic power station includes six station devices 100. Three of the six station devices 100 are in a model 1 and the other three station devices 100 are in a model 2. The station devices with the model 1 correspond to a training module 210 located on the left, that is, the first training module. The station devices with the model 2 correspond to a training module 210 located on the right, that is, the second training module. The station devices 100 with the model 1 generate electric arc detection samples and upload the electric arc detection samples to the first training module. The station devices 100 with the model 2 generate electric arc detection samples and upload the electric arc detection samples to the second training module.

In summary, according to the embodiments of the present disclosure, databases 211 are established for the station devices 100 according to models, and electric arc detection samples of the station devices 100 are periodically uploaded to update a training set, so that the updated training set is more applicable to the actual operating condition. The model training device 200 periodically uploads the second electric arc detection model 213 by using the updated training set, and pushes the second electric arc detection model to the corresponding station device 100. The station device 100 detects an electric arc by using the updated first electric arc detection model. Therefore, according to the embodiments of the present disclosure, models are periodically trained for the devices according to models by incremental learning, so that the trained electric arc detection model has uniqueness and timeliness, thereby improving the accuracy of electric arc detection. In addition, in the embodiments of the present disclosure, it is determined, in response to a station device newly connected to the model training device, whether a model of the device exists in the model training device. An electric arc detection model corresponding to the model is directly pushed if the model already exists, without repeated training.

It should be noted that the above descriptions show only some preferred embodiments and technical principles of the present disclosure. Those skilled in the art should understand that the present disclosure is not limited to the embodiments described above. Those skilled in the art may make various variations, modifications and substitutions without departing from the protection scope of the present disclosure. Therefore, although described in detail with the above embodiments, the present disclosure is not limited to the above embodiments. The present disclosure may further include more other equivalent embodiments without departing from the invention concept of the present disclosure. Instead, the present disclosure is determined by the scope of the appended claims.

The invention claimed is:

1. A method for detecting an electric arc, performed by an electric arc detection system, wherein the electric arc detection system comprises a station device and a model training device, the station device is provided with a first electric arc detection model, and the method comprises:
   detecting the electric arc through the first electric arc detection model, uploading an electric arc detection sample to the model training device by the station device, and updating an electric arc detection sample originally in the model training device;
   retraining a second electric arc detection model based on the updated electric arc detection sample by the model training device, to obtain the updated second electric arc detection model; and
   updating the first electric arc detection model based on the updated second electric arc detection model, by the model training device.

2. The method according to claim 1, wherein the detecting the electric arc through the first electric arc detection model by the station device comprises:
   sampling a current signal and extracting a feature parameter; and
   determining by the first electric arc detection model based on the feature parameter whether the electric arc occurs.

3. The method according to claim 1, wherein
   the electric arc detection sample comprises a feature parameter, an electric arc flag, a device serial number, a sample sampling time, and a sample serial number, wherein the feature parameter is a basis for the first electric arc detection model to detect the electric arc, and the electric arc flag indicates whether the electric arc occurs.

4. The method according to claim 3, further comprising:
   manually verifying the electric arc detection sample before the uploading the electric arc detection sample to the model training device, wherein the manually verifying the electric arc detection sample comprises:
   manually determining whether a determination result by the first electric arc detection model is correct, and changing a value of the electric arc flag when the determination result is incorrect.

5. The method according to claim 1, wherein the station device is further provided with a local database, and the method further comprises:
   storing the electric arc detection sample to the local database, and uploading the stored electric arc detection sample to the model training device periodically or quantitatively by the local database, before the uploading the electric arc detection sample to the model training device.

6. The method according to claim 1, wherein the updating the electric arc detection sample originally in the model training device comprises:
   replacing earliest electric arc detection samples with latest electric arc detection samples, wherein the earliest electric arc detection samples are equal to the latest electric arc detection samples in number, and the earliest electric arc detection samples indicating that the electric arc occurs are retained.

7. The method according to claim 1, wherein
   the station device is at least one in number, the model training device is provided with at least one training module corresponding to the at least one station device, and station devices corresponding to the same training module are operating under a same operating condition.

8. The method according to claim 7, wherein the station devices corresponding to the same training module are of a same model.

9. The method according to claim 7, further comprising: connecting an additional station device to a station, wherein the connecting the additional station device to the station comprises: determining whether the additional station device matches a training module in the model training device; updating a first electric arc detection model of the additional station device as a corresponding electric arc detection model by the model training device, when the additional station device matches a training module; and pushing an initial electric arc detection model for the additional station device when the additional station device does not match any training module.

10. The method according to claim 1, further comprising: training an initial electric arc detection model for the station device before the detecting the electric arc through the first electric arc detection model, wherein the training the initial electric arc detection model comprises: connecting the station device to the model training device; acquiring initial electric arc detection samples to form an initial training set by the model training device; training the second electric arc detection model by the model training device using the initial training set to obtain an initial electric arc detection model; and sending the initial electric arc detection model by the model training device to the station device to form the first electric arc detection model.

11. The method according to claim 1, wherein the second electric arc detection model is trained by a machine learning algorithm.

12. A system for detecting an electric arc, comprising:
a station device, wherein the station device is provided with a first electric arc detection model, and the station device is configured to detect the electric arc through the first electric arc detection model and generate an electric arc detection sample; and
a model training device connected to the station device, wherein the model training device is configured to: receive the electric arc detection sample uploaded by the station device and update a stored electric arc detection sample; retrain a second electric arc detection model based on the updated electric arc detection sample to obtain an updated second electric arc detection model; and
update the first electric arc detection model based on the updated second electric arc detection model.

13. The system according to claim 12, wherein
the station device is at least one in number, the model training device is provided with at least one training module corresponding to the at least one station device, and station devices corresponding to the same training module are configured to operate under a same operating condition, wherein the training module comprises:
a database configured to store the electric arc detection sample corresponding to the station device; and
a model training unit configured to retrain the second electric arc detection model based on the electric arc detection sample to obtain the updated second electric arc detection model.

14. The system according to claim 13, further comprising:
a host computer connected between the station device and the model training device, and configured to manually verify the electric arc detection sample uploaded by the station device.

15. The system according to claim 12, further comprising:
a host computer connected between the station device and the model training device, and configured to manually verify the electric arc detection sample uploaded by the station device.

* * * * *